United States Patent [19]

Jahani

[11] Patent Number: 5,325,566
[45] Date of Patent: Jul. 5, 1994

[54] AUTOMATIC WASH STATION FOR CLEANING MAGNETIC DISK HEADS

[75] Inventor: Hooshang Jahani, Fremont, Calif.

[73] Assignee: Tooltek Engineering Corp., Fremont, Calif.

[21] Appl. No.: 934,032

[22] Filed: Aug. 24, 1992

[51] Int. Cl.$^5$ .............................................. B08B 11/02
[52] U.S. Cl. .................... 15/302; 15/21.1; 15/88.3; 15/97.1; 15/309.2
[58] Field of Search .............. 15/21.1, 88, 88.2, 88.3, 15/97.1, 88.1, 102, 65, 70, 77, 309.2; 264/39

[56] References Cited

U.S. PATENT DOCUMENTS

| | | | |
|---|---|---|---|
| 3,939,514 | 2/1976 | Cook | 15/88.2 |
| 4,323,099 | 4/1982 | Bost | 15/77 |
| 5,092,011 | 3/1992 | Gommori et al. | 15/88.3 |

*Primary Examiner*—Edward L. Roberts
*Attorney, Agent, or Firm*—Fliesler, Dubb, Meyer & Lovejoy

[57] ABSTRACT

An automatic wash station for cleaning magnetic disk recording and reproducing heads held in a magnetic head row tool during production of the magnetic heads to prevent damage due to abrasive particles or other contaminants. A first embodiment includes a housing through which a shuttle passes carrying a group of magnetic head row tools manually loaded in a vise. Dispensers above the shuttle spray DI water for a pre-rinse, surfactant and DI water during cleaning and brushing, DI water for a post rinse, and air for final drying. Rotating brushes are arranged parallel and perpendicular to the motion of the shuttle through the housing. The shuttle can move both through the housing in a straight fashion, and back and forth from side to side of the housing. Operation of the shuttle, dispensers and rotating brushes can be programmed to be automatic, or can be done manually. In a second embodiment, a spring loaded clamp operates to allow manual loading and unloading of individual magnetic head row tools. Further, brushes are arranged to brush the deposition and identification sides of the magnetic heads. In a third embodiment means are provided for automatically loading and unloading individual row tools, and continuously carrying the magnetic head row tools through the wash station.

27 Claims, 9 Drawing Sheets

FIG. 3

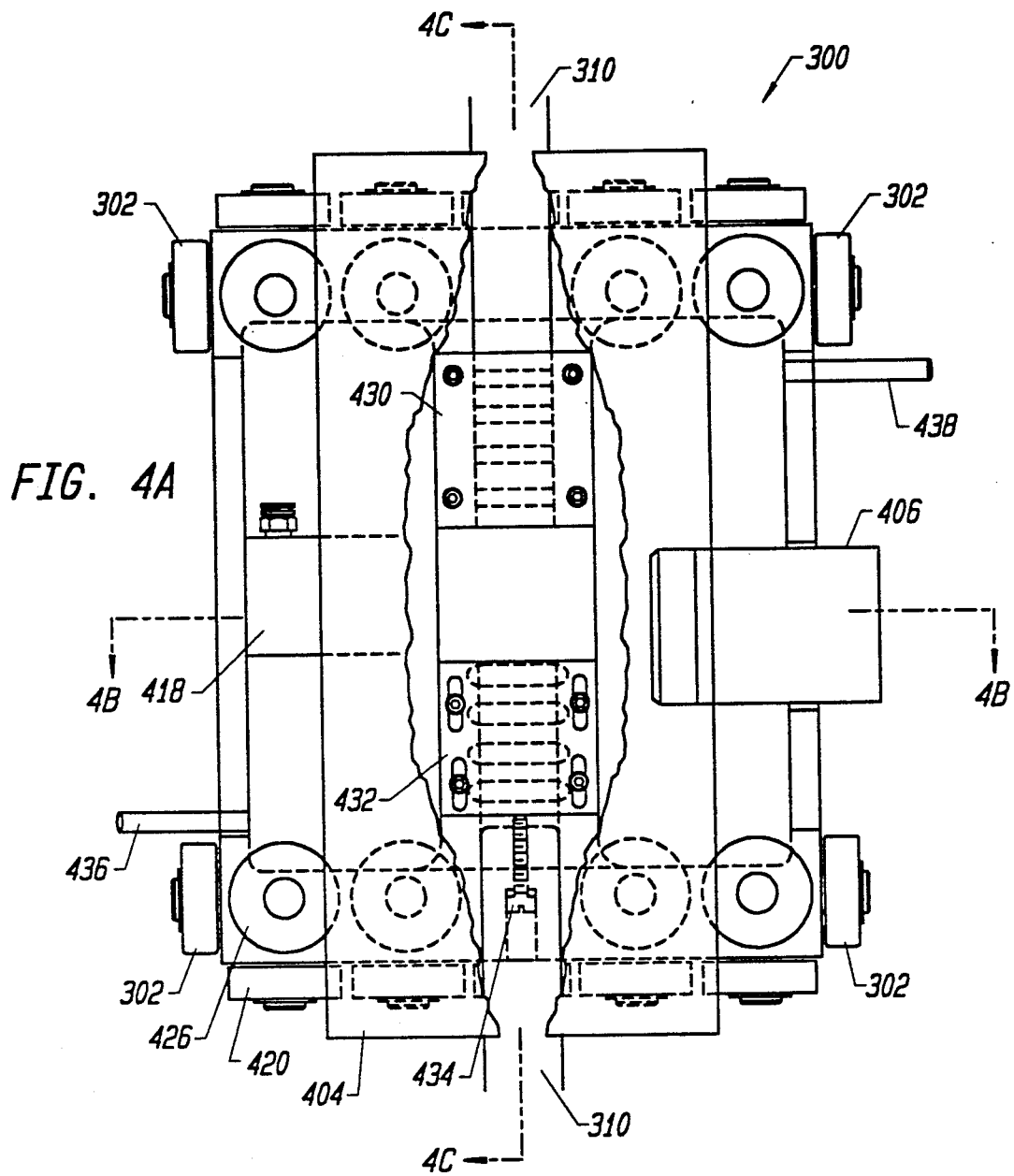

AUTOMATIC WASH STATION FOR CLEANING MAGNETIC DISK HEADS

BACKGROUND

1. Field of the Invention

The present invention relates to an apparatus and method for cleaning a magnetic disk recording and reproducing head during production of the magnetic head to prevent damage due to various in process contaminants.

2. Description of Related Art

Removal of contaminants during the manufacture of magnetic heads plays an important role in performance and durability of disk drive systems. As device sizes in the industry are reduced and the number of process steps increased, contamination control requirements become more stringent. A major cause of yield loss in magnetic head fabrication can be traced to the manufacturer's processing methods and tools including deposition processes, grinding, lapping and slicing, each a notorious source of particles.

With the current size of magnetic heads, circuitry deposited on the magnetic heads may have line widths and spacing between lines on the order of 0.001 in. Particles wedging between deposited lines can later come loose, falling between the magnetic head and the magnetic disk rotating beneath causing failure of a disk drive system containing the magnetic head.

FIG. 1 shows a typical magnetic head row tool used in fabricating a plurality of magnetic heads. The magnetic head row tool consists of a ceramic or metallic substrate 100, or other structure such as a bar on which magnetic heads 102 are fabricated.

The expanded view of a magnetic head 102 shows detail of two sides of the magnetic head, a deposition side 106 and an identification side 112. The deposition side shows bonding pads 108 with pad widths and spacing between bonding pads on the order of 0.001-0.005 in. The pads 108 are deposited to carry signals to and from the windings of the magnetic head device. The identification side shows the identification numbers which are typically inscribed into the magnetic head. Like the deposited lines on the deposition side, particles can also become wedged in the identification numbers on the identification side.

Conventional techniques used by manufacturers to remove contaminants from the heads during manufacture include spraying the heads with high pressure deionized (DI) water, using ultrasonics, and spraying with a vapor degreaser such as freon.

The results of conventional techniques have not been satisfactory. The high pressure and ultrasonic systems basically do not break away the debris and vapor systems loosen contaminants from the magnetic head but do not take the contaminant off. Vapor systems also can cause an adverse environmental impact.

SUMMARY OF THE INVENTION

An object of the present invention, therefore, is to provide a method for cleaning magnetic heads after fabrication to both break away and remove contaminants from the magnetic heads without causing an adverse environmental impact.

Another object is to provide an apparatus which automates the cleaning process rather than using manual cleaning process steps to reduce cleaning costs, decrease time required for cleaning, and to avoid the likelihood of inconsistences brought about by different human operators performing the manual process steps.

The above objects as well as other objectives are met with present invention of a wash station for cleaning magnetic disk recording and reproducing heads held in a magnetic head row tool using an apparatus which automatically brushes and dispenses deionized water, surfactant, and air for drying to both break away and remove abrasive particles from the magnetic heads. Note that although the magnetic heads are referred to as being contained on a magnetic head row tool, the magnetic heads may also be washed by the embodiments of the present invention in uncut bars, or in wafer form.

A first embodiment of the wash station includes a housing through which a shuttle passes carrying a group of magnetic head row tools in a vise. Dispensers above the shuttle spray deionized water for a pre-rinse, surfactant and deionized water during brushing, deionized water for a post rinse, and air for final drying. Rotating brushes are arranged parallel and perpendicular to the motion of the shuttle through the housing. The shuttle can move both through the housing in a straight fashion, and back and forth from side to side of the housing. Operation of the shuttle liquid dispensers, air dispensers and rotating brushes can be programmed to be performed automatically to eliminate inconsistencies, or can also be performed manually.

In a second embodiment, a spring loaded clamp operates to allow ease of manual loading and unloading of magnetic head row tools one unit at a time. The clamp is released when a shuttle which carries the magnetic head row tool is ready for loading and unloading, but is activated to clamp the magnetic head row tool during washing. Further, brushes are arranged to brush the deposition and identification sides of the magnetic heads.

In a third embodiment, means are provided for loading and unloading multiple magnetic head row tools and for continuously feeding the magnetic head row tools through the wash station. The third embodiment further provides continuous flow enabling magnetic head row tools to be added to the loading means and taken off from the unloading means while other magnetic head row tools are in the loading means, proceeding through the wash station, or are already in the unloading means.

BRIEF DESCRIPTION OF THE DRAWINGS

Further details of the present invention are explained with the help of the attached drawings in which:

FIG. 3 shows a cut away view of the wash station housing of FIG. 2 showing internal components of the first embodiment;

FIG. 4A shows a top view of a shuttle used to carry magnetic head row tools through the wash station of the present invention;

FIG. 4B shows a section A—A' cutaway view of the shuttle of FIG. 4A;

DETAILED DESCRIPTION

I. First Embodiment

FIG'S. 2-5 show the first embodiment of a wash station of the present invention.

Figure 2:
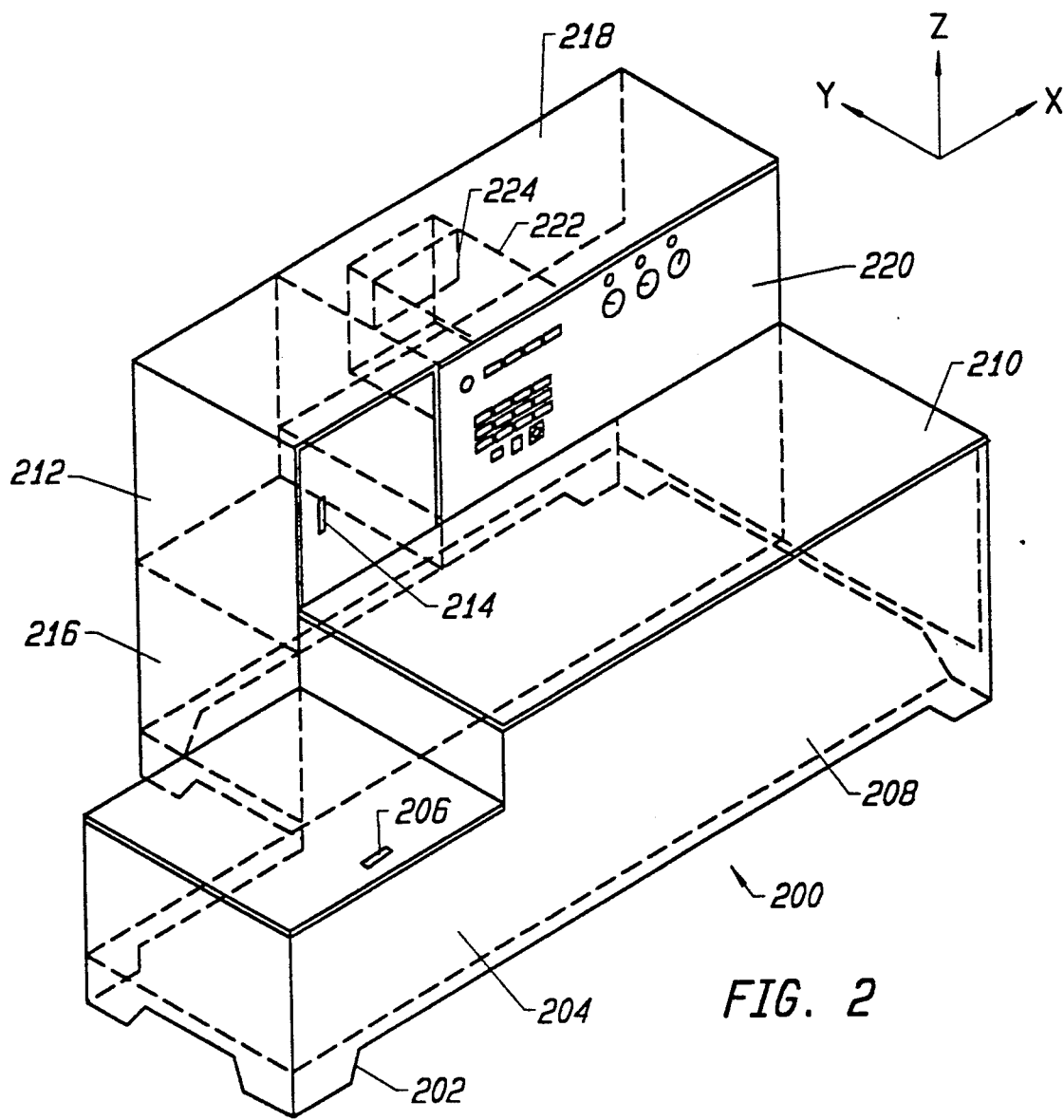
FIG. 2 shows a perspective view of the wash station housing for the first embodiment of the wash station of the present invention.

FIG. 2 shows a perspective view of the wash station housing 200 for the first embodiment. The wash station housing includes a housing base 202 designed to set on a work bench and five chambers. The five chambers include a load/unload chamber 204 for loading magnetic head row tools into the wash station, a washing chamber 208 containing liquid and air dispensers and brushes for washing the magnetic heads carried by the magnetic head row tools, a surfactant chamber for storing a bottle of surfactant 212, a chamber containing tubing carrying air and liquids as well as valves and other components 216, and an instrumentation chamber 218.

Transparent doors are provided for viewing the condition of components in the wash station. A transparent door 206 over the load/unload chamber 204 enables easy loading and unloading of magnetic head row tools as well as viewing to determine when a shuttle carrying the heads is in position to be loaded or unloaded. A transparent door 214 to the surfactant chamber 212 allows viewing of the quantity of surfactant stored in the surfactant bottle and removal and replacement of the bottle when surfactant runs out. A transparent door 210 over the washing chamber 208 allows viewing of components in the wash station and repair and replacement of parts in the wash station if repair or replacement of parts is required.

A control panel 220 contains indicator lights, pressure regulators, and switches enabling both manual and automatic operation of the wash station 200.

An x-y-z axis reference frame is also shown for reference in explanation of drawings which follow. The z axis proceeds upward from the base of the wash station, the x axis proceeds from the load/unload chamber 204 through the washing chamber 208, and the y axis proceeds across the load/unload chamber 204 and washing chamber 208.

Figure 3:
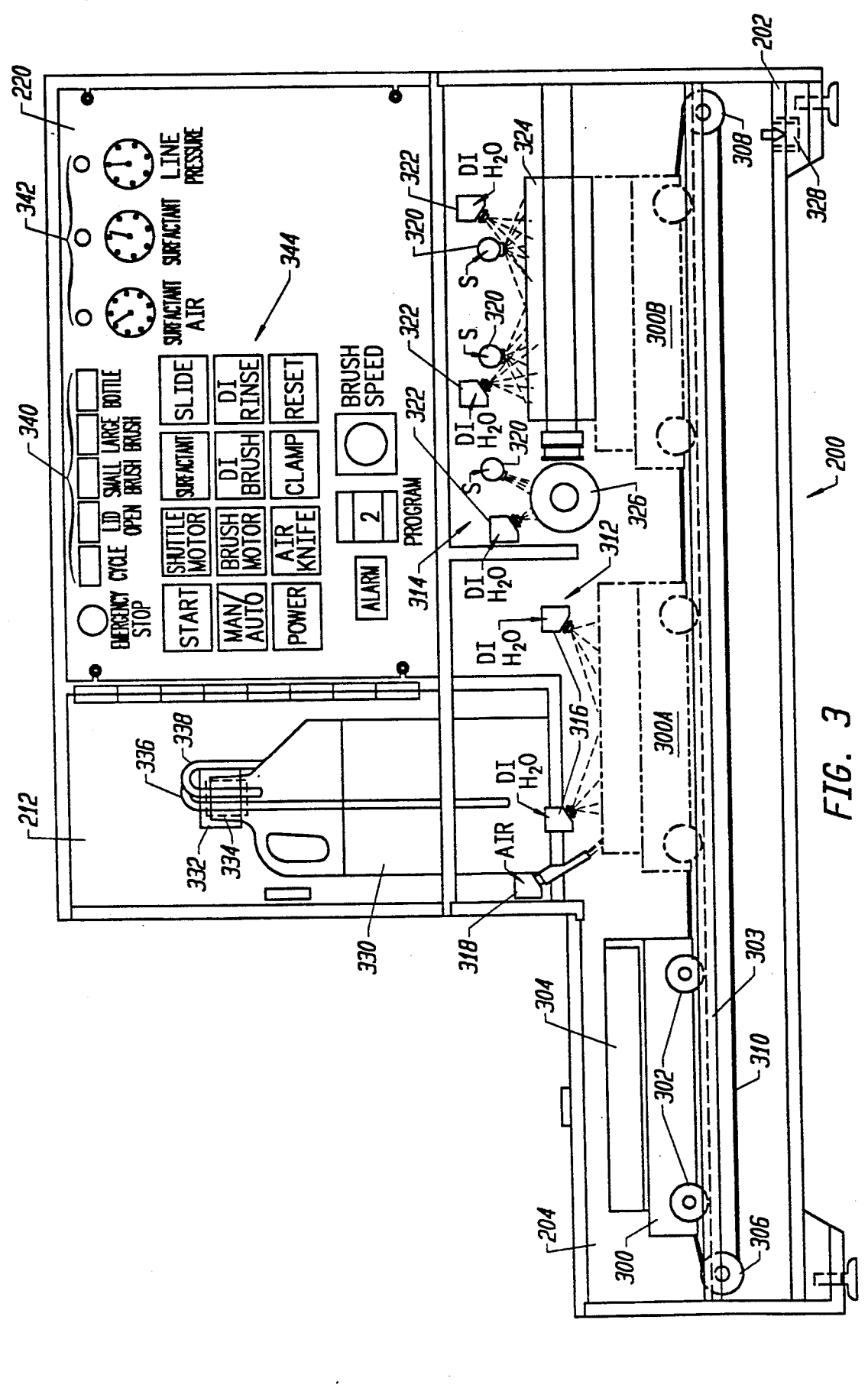

FIG. 3 shows a cut away view along an x-z plane of the wash station housing 200 of FIG. 2. FIG. 3 shows the details of components in the unload/load chamber 204, the washing chamber 208, the surfactant chamber 212, and the control panel 220.

The load/unload chamber 204 is shown containing a shuttle 300 which carries a vise 304, a tray, or another fixture for holding a plurality of magnetic head row tools. The shuttle travels on wheels 302 which roll in grooved tracks formed in a base plate 303. The shuttle is driven through the wash station by a shuttle drive belt 310 which is attached to the shuttle, and travels over pulleys 306 and 308. The pulleys in turn are driven by an electric shuttle motor (not shown).

The washing chamber 208 is shown divided into a rinse/dry chamber 312 and a brush chamber 314. The shuttle 300 shown in the load/unload chamber 204 is also shown in dash lines at 300A and 300B as it is pulled by the shuttle drive belt 310 through the rinse/dry chamber 312 and the brush chamber 314.

As the shuttle 300 passes through the rinse/dry chamber 312 at 300A, both before and after passing through the brush chamber 314, deionized (DI) water is sprayed by DI dispensers 316 to pre-rinse and post-rinse the magnetic heads on the magnetic head row tools carried by the shuttle. After passing through the brush chamber 312 and being post-rinsed, pressurized air at approximately 70-100 PSI is blown by an air dispenser nozzle 318 to dry the magnetic heads carried by the shuttle. Note that the air may also be heated above ambient temperature prior to being blown to dry the magnetic heads.

As the shuttle 300 passes through the brush chamber at 300B, surfactant is first sprayed from surfactant dispensers 320 onto a rotating large brush 324 and a rotating small brush 326. Large brush 324 is aligned with its center of rotation parallel to the x axis as identified in FIG. 1. Small brush 326 has an axis of rotation aligned parallel to the y axis. Small brush 326 can be arranged to rotate in a direction opposite of the direction of travel of the shuttle.

Surfactant flows through the surfactant dispensers 320 at low pressure, but pressurized air may also be blown into the surfactant dispensers with pressure controlled to atomize the surfactant and more evenly distribute the surfactant over the large and small brushes 324 and 326.

When the shuttle 300 reaches the end of the brush chamber 314, the direction of travel of the shuttle drive belt 310 is reversed to carry the shuttle 300 back through the brush chamber 314. During travel back through the brush chamber 314, DI water is sprayed by DI water dispensers 322 onto the large brush 324 and small brush 326 to rinse surfactant off of the magnetic heads. The motor which controls the shuttle drive belt can be controlled to carry the shuttle back and forth multiple times and at various speeds through the brush chamber 314 before reentering the rinse/dry station.

The motor which controls the shuttle drive belt 310 can also be controlled to carry the shuttle back and forth multiple times, and at various speeds through both the rinse/dry chamber and the brush station before the shuttle reenters the load/unload chamber ready for unloading.

Run off surfactant and DI water is drained from the wash station housing base 202 through a housing drain 328.

The surfactant chamber 212 is shown containing a standard one gallon bottle of surfactant 330 which is supplied by manufacturers of surfactant. The wash station contains a surfactant bottle cap 332 cut with six threads per inch to fit such a standard one gallon bottle 330 of most manufacturers. The wash station further contains a rubber stopper 334 tapered to fit into the opening of a standard one gallon bottle 330 of most manufacturers. Since the surfactant bottle cap 332 and rubber stopper 334 fit a standard bottle supplied by surfactant manufacturers, the user of the apparatus does not need to pour surfactant from such a bottle into a separate receptacle in the wash station. Passing through the cap 332 and rubber stopper 334 is a surfactant tube 338 carrying surfactant to the wash station, and an air vent tube 338.

The control panel 220 contains indicator lights 340, pressure regulators 342, and switches 344, each of which functions as described below:

Indicator Lights 340

Cycle: This light comes on while the wash station is operating automatically under control of a program.

Lid open: This indicates that the loading station is open. The machine cannot be activated while the lid is in an open position. If the lid is opened during either manual or automatic operation, the machine will cease operation and an alarm will sound.

Small brush: This indicates that the small brush replacement port (not shown) is open. If the small brush replacement port is open, the wash station will not operate as a safety precaution.

Large brush: This indicates that the large brush replacement port (not shown) is open. If the large brush replacement port is open, the wash station will not operate as a safety precaution.

Bottle: This indicates that the bottle is out of Surfactant. If the bottle is out of surfactant, the wash station will not operate.

Pressure Regulators 342

Surfactant Air: Regulates an air pressure valve to release air into the surfactant dispensers 320 to control a spray pattern and droplet size of the surfactant.

Surfactant: Regulates the amount of surfactant flowing through a surfactant valve. Regulated surfactant flow can also be achieved by a positive displacement metering pump.

Line Pressure: Regulates the incoming air line pressure needed for machine operation. Typically the required air pressure is 70-100 PSI.

Switches 344

Emergency Stop: Ceases all operations.

Start: Starts a cycle in automatic mode. Note that an additional water proof start switch can be mounted by the load/unload chamber for convenience of operation, but is not shown in FIG. 3.

Shuttle motor: Starts and stops forward operation of the shuttle motor to move the shuttle in the x direction from the beginning of the load/unload chamber to the end of the brush chamber. The shuttle motor will then reverse when the shuttle reaches the end of the brush chamber sending the shuttle back to the beginning of the load/unload chamber. This forward and reverse cycling of the shuttle in the x direction through the wash chamber will repeat as long as the shuttle motor switch is depressed.

Surfactant: Controls a valve to allow flow of surfactant.

Slide: Causes movement of the shuttle in the y direction.

Man/Auto: Switched off puts the wash station in a Manual (Man) mode. Switched on puts the wash station in an Automatic (Auto) mode.

Brush motor: Starts and stops the brush motor.

DI Brush: Controls a valve to allow flow of deionized water over the large and small brushes.

DI Rinse: Controls a valve to allow flow of deionized water for final rinse.

Power: Controls the main electrical power to the wash chamber.

Air knife: Controls a solenoid valve, controlling the air flow to the air dispenser.

Clamp: Operates the clamp on the shuttle to hold the vise in place.

Reset: Brings the shuttle to the beginning of the load/unload chamber. Reset can also be referred to as a home position switch.

Alarm: Activated causes the alarm to sound at the end of a cycle, when the lid is open, when the large brush door, or small brush door is open. Deactivated prevents the alarm from sounding.

Program: Is a thumbwheel allowing selection one of a various number of numbered programs stored in the programmable array logic memory.

Brush Speed: Controls the speed of the brush motor which drives both the large and small brushes.

In the manual mode, the above listed switches are used independently to operate functions of the wash station. In an automatic mode, the wash station runs a program selected by the thumb wheel to control functions which must otherwise be performed manually using the switches. The duration and repeat of each switch function is set in each program independently. The program is stored in a programmable logic controller 222 (FIG. 2) contained in the wash station. The program is illustrated symbolically as 224. The programmable logic controller 222 is operated by the program 224 to control the motion of the drive belt and shuttle, spraying by the deionized water nozzle, speed of the brushes, spraying by the surfactant nozzle, and blowing by the air nozzle.

Figure 4C:
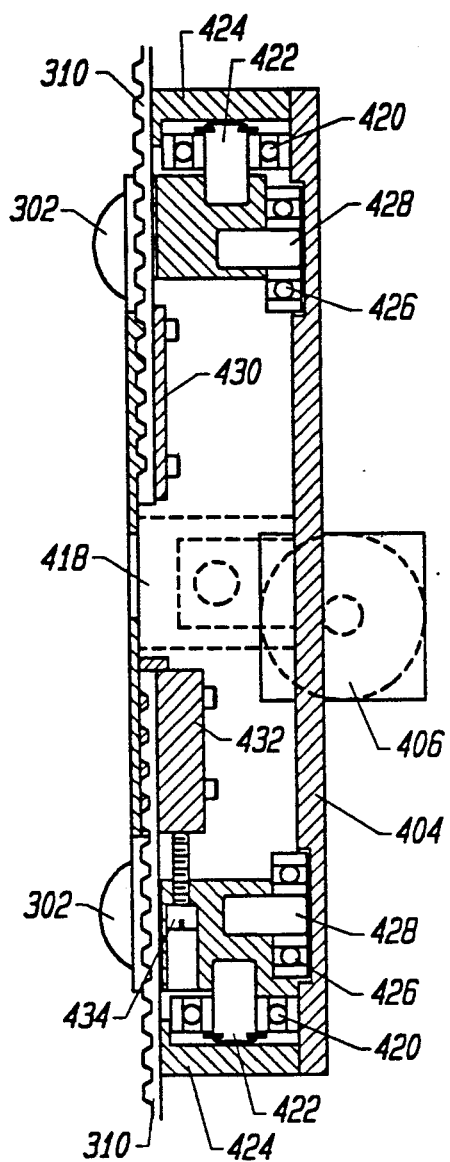
FIG. 4C shows a section B—B' cutaway view of the shuttle of FIG. 4A.

FIG'S. 4A-4C are assembly drawings showing the shuttle 300. FIG. 4A shows the top view of the shuttle 300. FIG. 4B shows a section, A—A' cutaway view of the shuttle of FIG. 4A, and FIG. 4C shows a section B—B' cutaway view of the shuttle of FIG. 4A.

Referring first to FIG. 4B, the shuttle is shown as in FIG. 3 with wheels 302 which travel through grooved tracks in the base plate 303. The shuttle is pulled by drive belt 310. The shuttle also contains the vise 304 used to carry a plurality of magnetic head row tools during fabrication.

FIG. 4B further shows an angle bracket 402 against which vise 304 rests. The angle bracket 402 is attached to a base plate 404, and is replaceable to accommodate vises 304, trays or other fixtures of different sizes and shapes.

Also shown attached to base plate 404 is an pneumatically controlled cylinder which moves a piston shaft 408. The cylinder shaft 408 is movably connected to a clamping plate 410 by screw 412. The cylinder is electronically operated to move the clamping plate 410 to clamp and release the vise 304 to firmly hold the magnetic head row tools in place during cleaning, and to allow easy removal after cleaning.

The base plate 404 also includes a member extending vertically downward which is connected by a screw 414 to an air cylinder plunger 416 connected to an air cylinder 418. The air cylinder 418 operates to move the base plate back and forth in a y direction according to the reference frame of FIG. 2.

Referring now to FIG. 4A, the base plate 404, cylinder 406, air cylinder 418, and wheels 302 of the shuttle 300 can be clearly seen. Components at the center of base plate 404 are removed and a cut away view of shuttle drive belt 310 and first and second flat metal plates 430 and 432 for attaching the shuttle drive belt to the shuttle can be seen. Additionally vertical wheel bearings 420 and horizontal wheel bearings 426 along which the base plate 404 rides can be seen. Finally, FIG. 4A shows metal extension members 436 and 438 which trigger position sensors. Position sensors reverse the direction, or prevent operation of the shuttle drive belt motor when the shuttle reaches an end of either the load/unload chamber 204, the rinse/dry chamber 312, or the brush chamber 314.

Referring now to FIG. 4C, details of the attachment of the shuttle drive belt 310 and the vertical and horizontal wheel bearings 420 and 426 can be seen. The shuttle drive belt 310 is clamped on a first side of the shuttle using a first flat metal clamping plate 430. The first flat metal clamping plate 430 is placed over the belt and tightened down with screws as shown to hold the shuttle drive belt 310 in place relative to the shuttle. The shuttle drive belt 310 is clamped on a second side of the shuttle by a second flat metal clamping plate 432. The second flat metal clamping plate, likewise, is placed over the belt and tightened down with screws to hold the shuttle drive belt 310 in place. However, the second flat metal clamping plate 432 further is moved with tensioning screw 434 to take slack out of the shuttle drive belt 310. The tensioning screw avoids the need of a tensioning pulley in addition to the two pulleys 306 and 308 shown in FIG. 3.

A row of horizontal wheel bearings 420 are included on both sides of the shuttle to support the base plate 404 and enable the base plate to move in the y direction as referenced from the x-y-z axis of FIG. 2. The horizontal wheel bearings 420 are supported by horizontal wheel bearing axles 422. The base plate 404 further includes angle brackets 424 which extend below the horizontal wheel bearings 420 to prevent the base plate 404 from bouncing upward in the z direction and becoming detached from the rest of the shuttle.

A row of vertical wheel bearings 426 are also included on both sides of the shuttle to roll against grooves cut in the base plate 404, enabling the base plate to easily move in the y direction without movement in the x direction as referenced from the x-y-z axis of FIG. 2. The vertical wheel bearings 426 are supported by vertical wheel bearing axles 428. FIG. 4C also shows the wheels 302, the cylinder 406, and the air cylinder 418 which were described previously with reference to FIG'S. 4A-4B.

Figure 5:
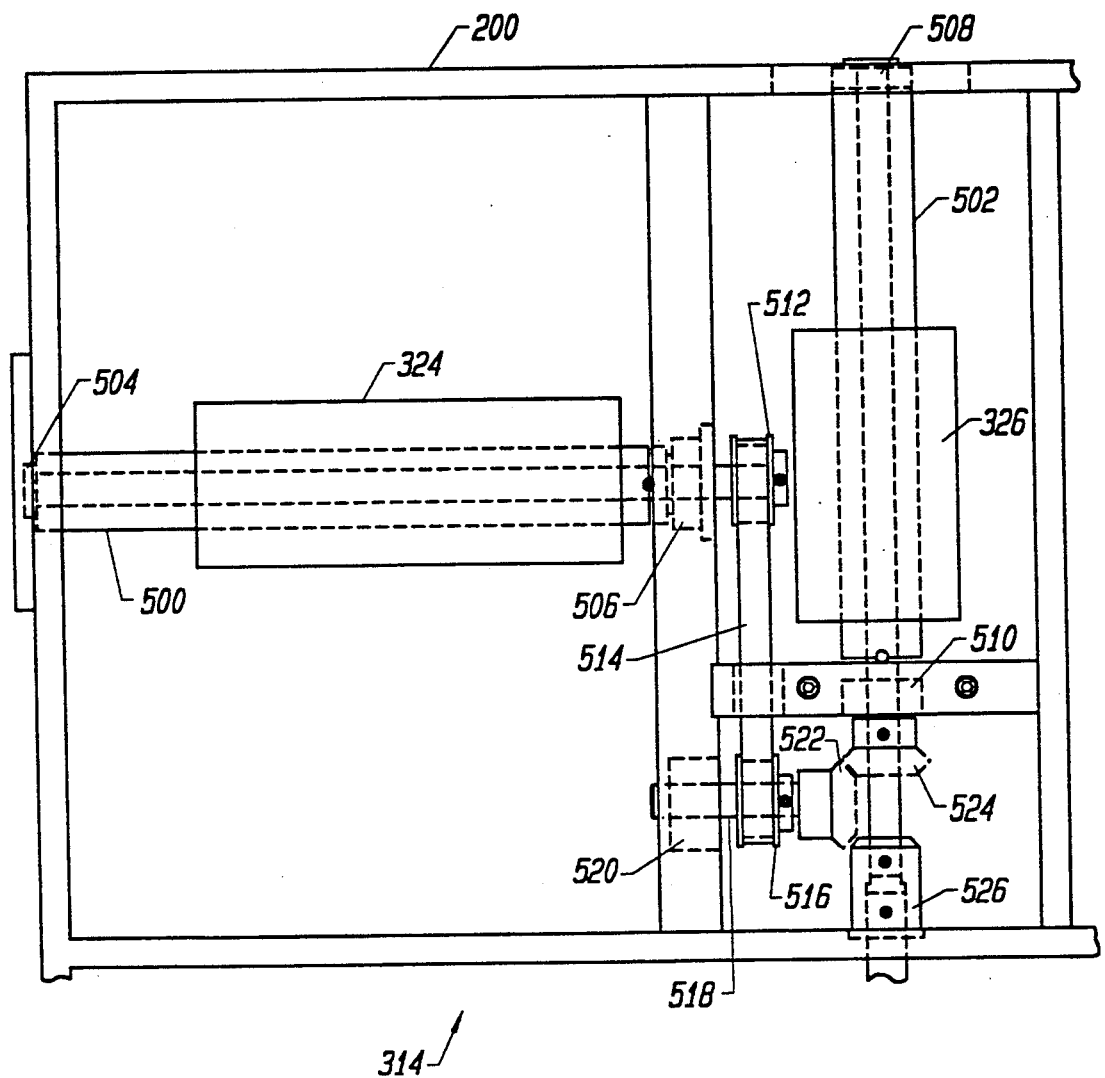
FIG. 5 shows a top view of a brushing chamber showing the brushes, and brush drive assembly of the first embodiment.

FIG. 5 shows a top view of the brushing chamber 314 of FIG. 3 containing the large brush 324, the small brush 326, and a brush drive assembly. Though the large and small brushes 324 and 326 are referred to as large and small, it will be understood that different relative sizes may be used.

The brush drive assembly includes a large brush drive shaft 500 passing through the large brush 324 and a small brush drive shaft 502 passing through small brush 326. The large brush drive shaft 500 is rotatably mounted to the wash station housing 200 by bearings 504 and 506 mounted in the wash station housing 200. The small brush drive shaft 502 is likewise rotatably mounted to the wash station housing 200 by bearings 508 and 510 mounted in the wash station housing 200.

The large brush drive shaft 500 extends to bearing 504. The large brush drive shaft 500 also extends past bearing 506 inside the brush chamber 314 and is connected to a pulley 512.

Pulley 512 is connected by a belt 514 to another pulley 516. Pulley 516 is mounted on a drive shaft 518 which is connected on one end to a bearing 520 mounted in the wash station housing and on another end to a gear 522. Gear 522 has teeth which are driven by another gear 524.

The small brush drive shaft 502 extends past bearing 510 where it is connected to gear 524. The small brush drive shaft 502 extends to coupling 526 located out of the brushing station 314 where the shaft is connected to the brush drive motor (not shown). Thus, large and small brushes 324 and 326 are connected by a brush drive assembly enabling a single brush drive motor to turn both the large and small brushes 324 and 326 to clean magnetic heads on the magnetic head row tools which pass beneath.

II. Second Embodiment

FIG'S. 6-8 show the second embodiment of a wash station 600 of the present invention.

Figure 6:
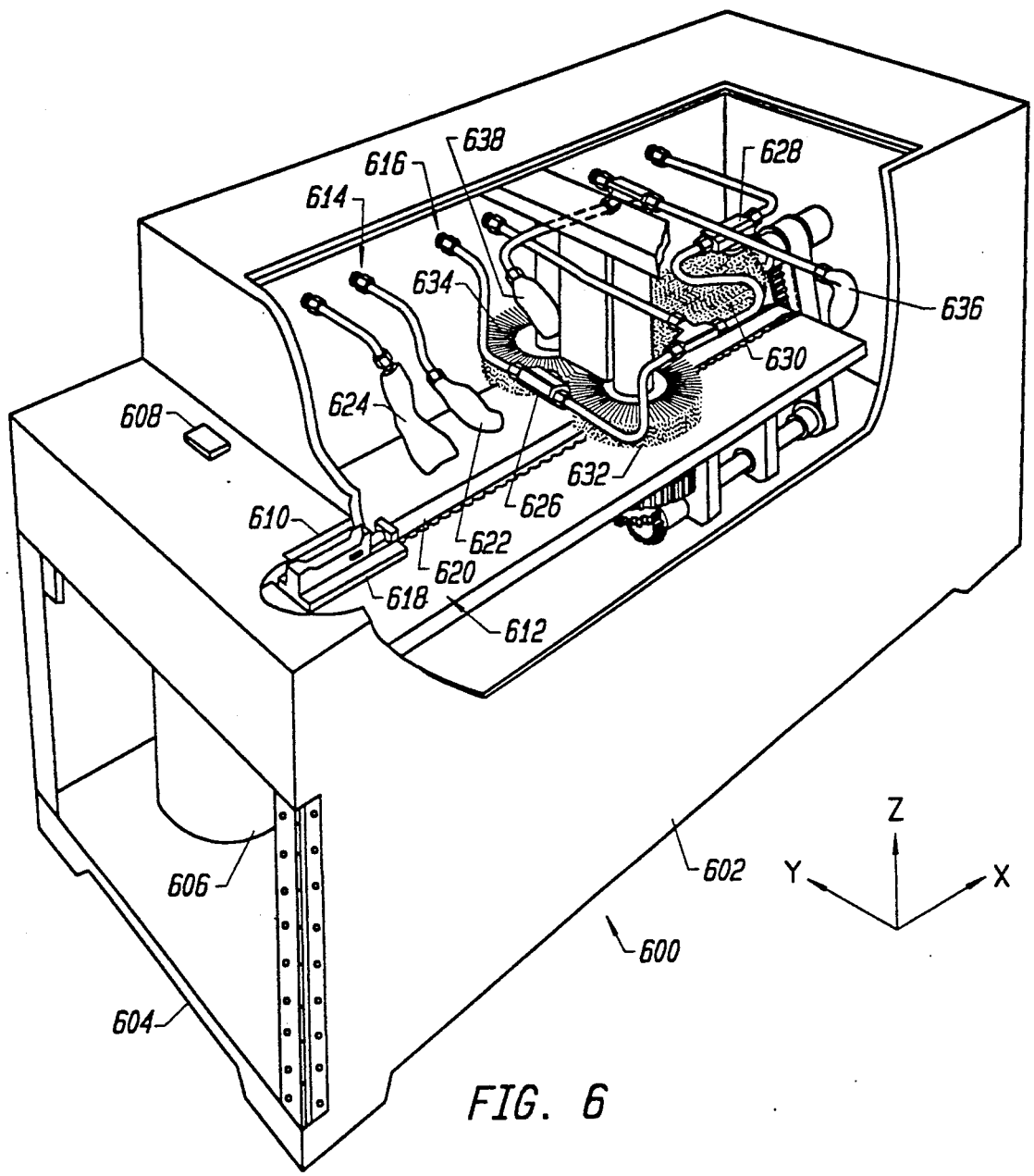
FIG. 6 shows a perspective view of the second embodiment of the wash station of the present invention.

FIG. 6 shows a perspective view of the wash station housing 602 for the second embodiment. As in FIG. 2, an x-y-z axis reference frame is also shown for reference in explanation of components which follow.

The wash station housing 600 includes a transparent door 604 exposing the bottom of a surfactant bottle 606. The transparent door 604 allows viewing of the quantity of surfactant stored in the surfactant bottle and removal and replacement of the bottle when surfactant runs out.

The wash station housing 600 further contains a single start/stop button 608. Unlike the first embodiment, the second embodiment operates entirely automatically, the start/stop button 608 controls a program which performs the manual functions listed with respect to the first embodiment.

The wash station housing also includes a slot 610 through which a single magnetic head row tool may be inserted and removed. Unlike the first embodiment, opening a door to load and unload magnetic head row tools is not required.

The wash station housing 600 is shown cut away in FIG. 6 to show a perspective view of components contained within. Like the first embodiment, the wash station 600 contains a load/unload area 612, a rinse/dry chamber 614, and a brush chamber 616.

The load/unload area 612 is shown containing a shuttle 618 which carries a single magnetic head row tool. The shuttle is attached to a drive belt 620 which conveys the shuttle through the wash station housing. As in the first embodiment, the drive belt 620 travels over pulleys driven by an electric shuttle motor (not shown).

As the shuttle 618 passes through the rinse/dry chamber 614, both before and after passing through the brush chamber 616, DI water is sprayed by DI dispenser 622 to pre-rinse and post-rinse the magnetic heads on the magnetic head row tool carried by the shuttle 618. After passing through the brush chamber 616 and being post-rinsed, pressurized air is blown by an air dispenser nozzle 624 to dry the magnetic heads carried by the shuttle.

As the shuttle 618 passes through the brush chamber 616, surfactant is first sprayed from surfactant dispensers 626 and 628 onto a brush rotating with an axis of rotation in an x axis direction (x axis brush) 630 and two brushes rotating with an axis of rotation in a z direction (z axis brushes) 632 and 634. Z axis brushes 632 and 634 can be arranged to rotate in a direction opposite of the direction of travel of the shuttle.

When the shuttle at 618 reaches the end of the brush chamber 616, the direction of travel of the shuttle drive belt 620 is reversed to carry the shuttle 618 back through the brush chamber 616. During travel back through the brush chamber 616, DI water is sprayed by DI water dispensers 636 and 638 onto the x axis brush 630 and the z axis brushes 632 and 634 to rinse surfactant off of the magnetic heads.

As in the first embodiment, the electric shuttle motor can also be controlled to carry the shuttle back and forth multiple times, and at various speeds through the rinse/dry chamber and the brush chamber before the shuttle reenters the load/unload area ready for unloading.

Although the second embodiment is not shown containing features such as a control panel of the first embodiment, it is of course within the scope of the present invention to include elements such as the control panel containing indicator lights, pressure regulators, and switches as in the first embodiment.

Figure 7A:
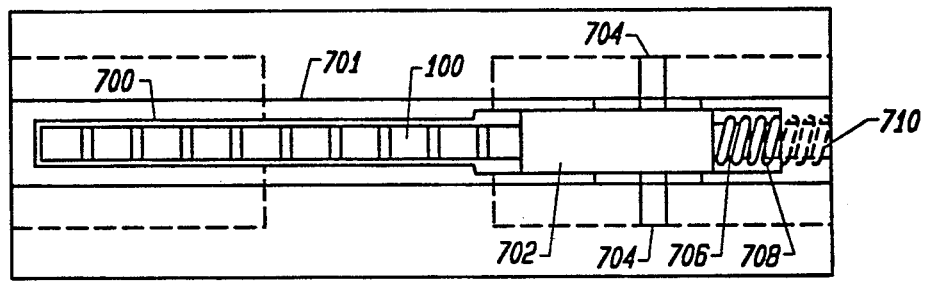
FIG. 7A shows the top view of the shuttle of the second embodiment.
Figure 7B:
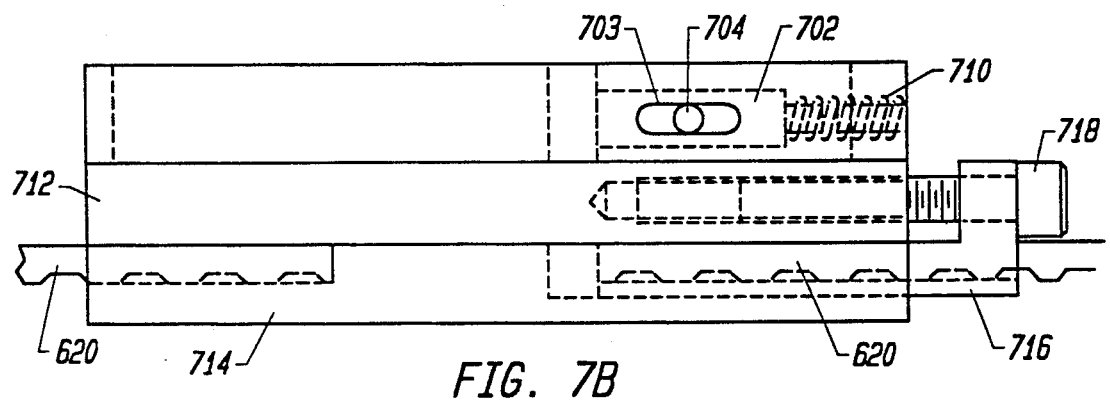
FIG. 7B shows the side view of the shuttle of the second embodiment.
Figure 7C:
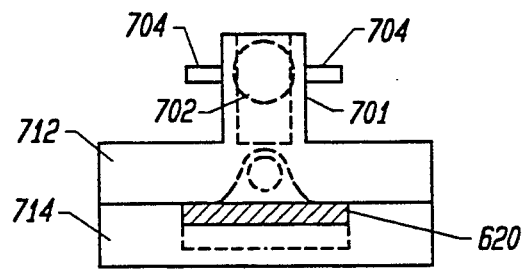
FIG. 7C shows the front view of the shuttle of the second embodiment.

FIG'S. 7A-7B shows assembly drawings showing the shuttle 618 of the second embodiment. FIG. 7A shows the top view of the shuttle 618. FIG. 7B shows a side view of the shuttle 618, and FIG. 7C shows a front view of the shuttle 618.

Figure 1:
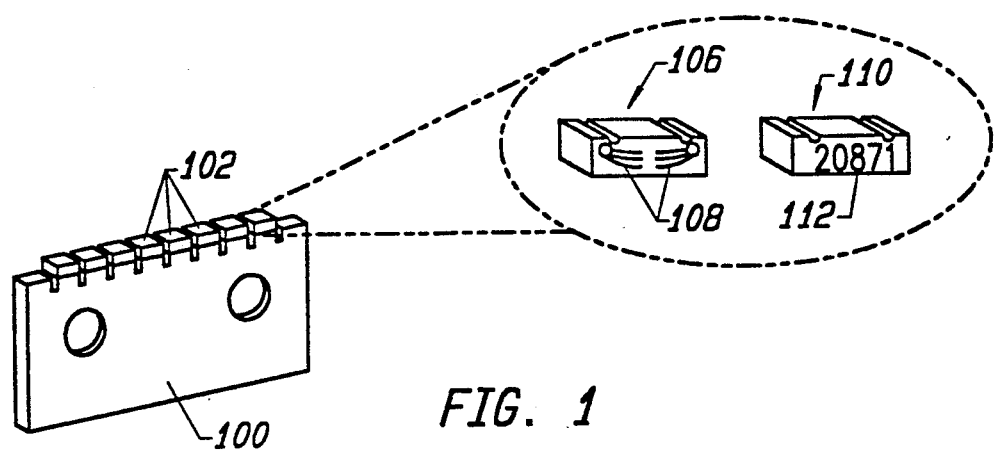
FIG. 1 shows a magnetic head row tool containing a plurality of recently fabricated magnetic heads.

Referring first to FIG. 7A, the shuttle 618 is shown as in FIG. 6 holding a magnetic head row tool 100, with magnetic heads facing up, as shown in FIG. 1. The magnetic head row tool is contained in a vertical slot 700 machined into a metal protruding component 701 of the shuttle. The metal protruding component 701 of the shuttle can be seen more clearly with respect to FIG. 7C. The magnetic head row tool 100 is held firmly in the slot 701 by block 702. The block 702 includes first and second extension members 704 which extend through horizontal slots 703 cut into the metal protruding member 701 of the shuttle. The horizontal slots 703 can be more clearly seen in FIG. 7B. A third extension member 706 on the block 702 holds a spring 708 which holds the block 702 in place against the magnetic row tool 100. A shuttle extension pin 710 holds the other end of the spring 708 in a fixed position.

Operation of the block 702 to enable automatic loading and unloading of the magnetic head row tool 100 can be explained as follows. When the shuttle 618 enters the load/unload area 612 as shown in FIG. 6, it passes through a vertical plate (not shown). The vertical plate has an opening machined into it in the shape of the shuttle 618 as shown in FIG. 7C, but without allowance for first and second extension members 704. Thus, when the shuttle passes into the load/unload area, the first and second extension members 704 are held, compressing spring 708 and releasing the magnetic head row tool for easy removal or reinsertion. When the shuttle passes out of the load/unload area, the first and second extension members 704 are released releasing spring 708 and forcing block 702 tightly against the magnetic head row tool 100 firmly holding the magnetic head row tool in place.

Referring now to FIG. 7B, components which attach shuttle drive belt 620 can be seen. A first side of the shuttle drive belt 620 is clamped into the shuttle between shuttle members 712 and 714. Shuttle members 712 and 714 are also clearly shown in FIG. 7C. Shuttle members 712 and 714 can be held together to clamp the shuttle drive belt 620, or separated to release shuttle drive belt using bolts (not shown).

A second side of the shuttle drive belt 620 is held by angle bracket 716. Since the shuttle drive belt 620 has teeth, the shuttle drive belt is inserted through an opening in angle bracket 716 and is held at a position after being inserted through the opening by teeth on the angle bracket engaging the shuttle drive belt teeth. The angle bracket is then inserted through an opening in shuttle member 714. Angle bracket 716 further includes a tensioning bolt 718 which can be screwed into shuttle member 712. Tensioning bolt 718 is screwed into shuttle member 712 to remove slack from shuttle drive belt 620. The tensioning bolt 718 eliminates the need for a tensioning pulley as discussed previously in connection with the shuttle of the first embodiment.

Figure 8:
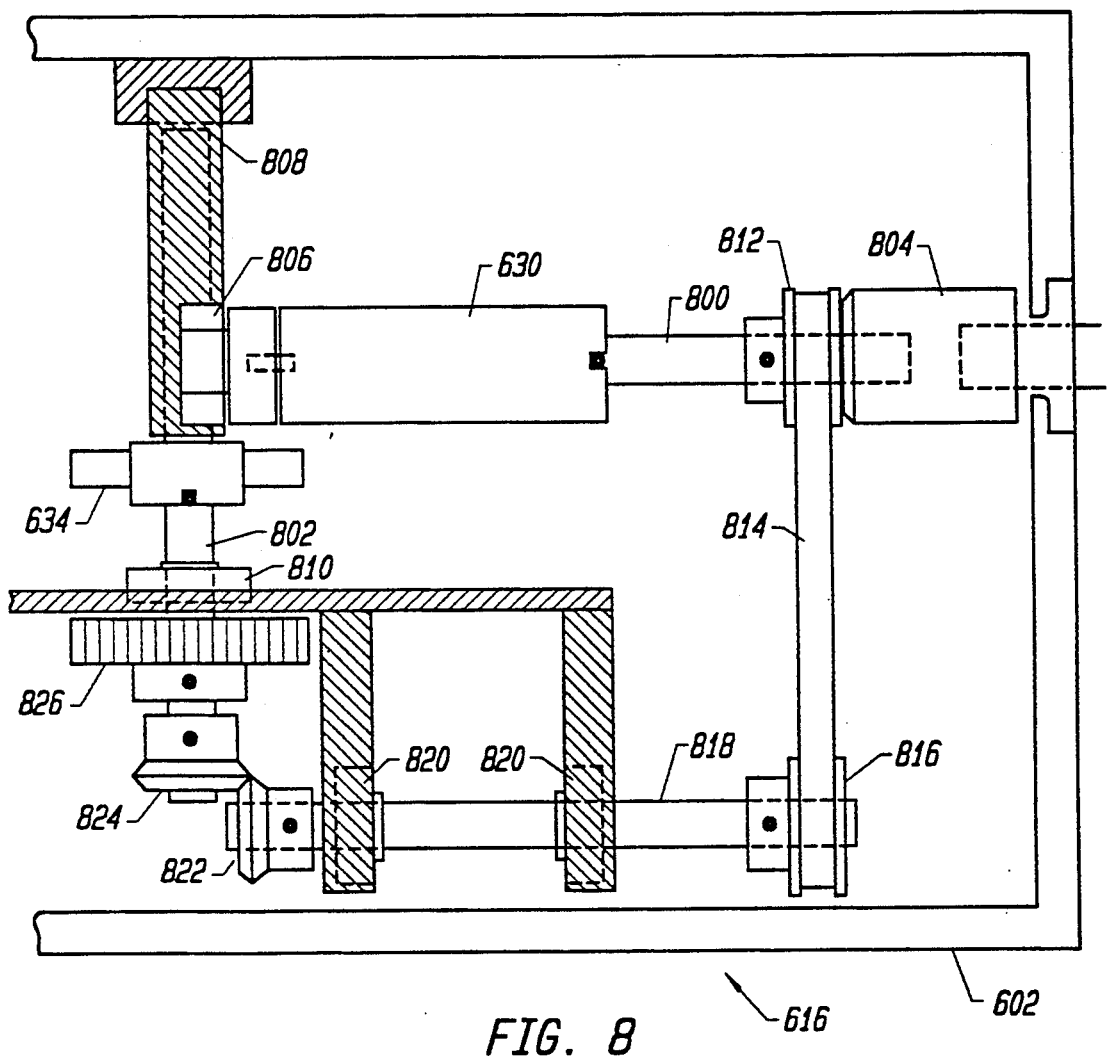
FIG. 8 shows a side cutaway view of the brushes and brush drive assembly of the second embodiment.

FIG. 8 shows a side cutaway view along an x-z plane of the brushing chamber 616 as referenced from the x-y-z plane of FIG. 6. The components shown include the x axis brush 630, the z axis brushes 634, and a brush drive assembly.

The brush drive assembly includes a x axis brush drive shaft 800 passing through the x axis brush 630 and a z axis brush drive shaft 802 passing through z axis brush 634. The x axis brush drive shaft 800 is rotatably mounted to the wash station housing 602 by bearings 804 and 806 mounted in the wash station housing 602. The z axis brush drive shaft 802 is likewise rotatably coupled to the wash station housing 602 by bearings 808 and 810 mounted in the wash station housing 602.

The x axis drive shaft 800 extends to coupling 804 to be connected to the brush drive motor located out of the brushing station 616 (not shown). The x axis drive shaft 800 is connected on the inside of the brush chamber 616 to a pulley 812.

Pulley 812 is connected by a belt 814 to another pulley 816. Pulley 816 is mounted on a drive shaft 818 which is connected on one end to a bearing 816 mounted in the wash station housing and in the center to bearings 820. The drive shaft 818 extends past bearings to attach to a gear 822. Gear 822 has teeth which drive another gear 824.

The z axis drive shaft 802 extends past bearing 810 where it is connected to gear 824 as well as a gear 826. Gears 822 and 824 drive the x axis brush 630 and z axis brush 634 as connected by the brush drive assembly enabling the brush drive motor to turn both the x axis brush 630 and z axis brush 634. Gear 826 has teeth meshing with a similar gear (not shown) which is connected through a drive shaft connected to the other z axis brush 632 (not shown). Thus the brush drive motor drives all three brushes together to clean magnetic heads on the magnetic head row tools.

X axis brush 630 enables cleaning the top of the magnetic heads, i.e. the magnetically active surfaces, as in the first embodiment. However, the two y axis brushes 632 and 634 enable cleaning the deposition side 108 and identification side 112 of the magnetic heads as shown in FIG. 1. Brush bristle diameters on the order of 0.002–0.008 in. enable removal or particles between bonding pads, the bonding pads having widths and separation distances on the order of 0.001–0.005 in, as well as between numbers inscribed on the identification side of the magnetic heads.

III. Third Embodiment

Figure 9:
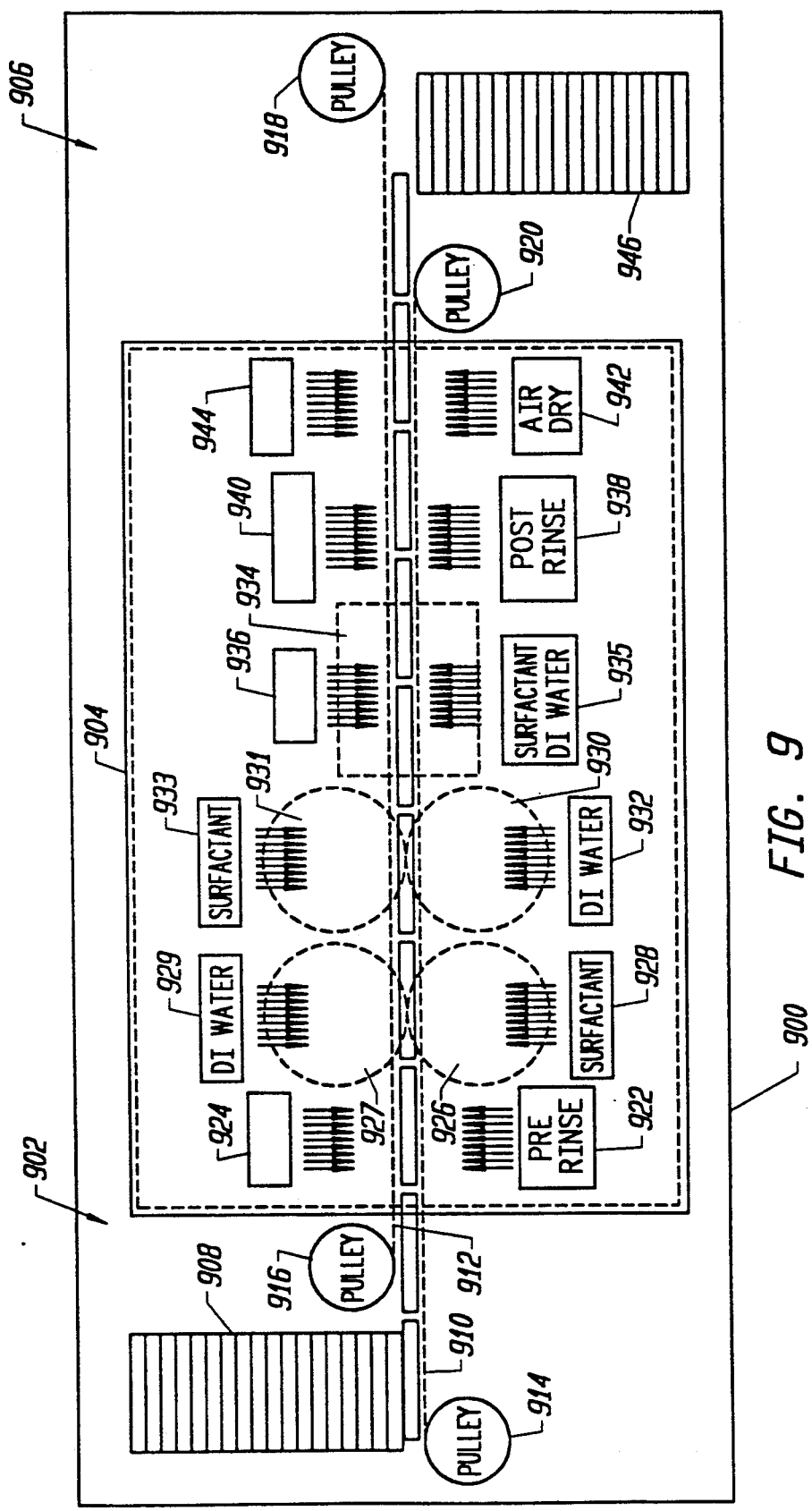
FIG. 9 shows a diagram of components for the third embodiment of the present invention.

FIG. 9 shows a diagram of components for the third embodiment of an automatic wash station 900 of the present invention. The third embodiment wash station 900 contains a loading area 902, a washing chamber 904, and an unloading area 906 arranged to allow a continuous flow of magnetic head row tools through the wash station.

Magnetic head row tools inserted into the loading area 902 are carried by loading means 908 such as a gravity feed chute to a first conveying belt 910. First conveying belt 910 has teeth-like protrusions which serve to separate the magnetic head row tools and to convey the magnetic head row tools through the wash station 900. Prior to exiting the loading area 902, a second conveying belt 912 passes against the opposite side of the magnetic head row tools. The first conveying belt 910 and second conveying belt 912 together hold the magnetic head row tools securely in between as the magnetic head row tools pass through the washing chamber 904 to follow. The first and second conveying belts 910 and 912 are driven by pulleys 914, 916, 918, and 920 as shown.

Upon entering the washing chamber 904, the magnetic head row tools pass through pre-rinse dispensers 922 and 924 which spray DI water onto the magnetic heads on the magnetic head row tools.

The magnetic head row tools then pass through two pairs of z axis brushes 926 and 927, and 930 and 931 rotating with an axis of rotation in a z direction to scrub the deposition and identification sides of the magnetic heads as described previously with respect to the second embodiment of the present invention. As the magnetic head row tools pass through the first pair of z axis brushes 926 and 927, surfactant and DI water are sprayed from surfactant dispenser 928 and DI water dispenser 929 onto the z axis brushes 926 and 927. Further, as the magnetic head row tools pass through the second pair of z axis brushes 930 and 931, surfactant and DI water is sprayed onto the z axis brushes by DI water dispenser 932 and surfactant dispenser 933 for rinsing.

The magnetic head row tools next pass beneath an x axis brush 934 rotating with an axis of rotation in an x direction to scrub the top of the magnetic heads as described previously with respect to both the first and second embodiments. As the magnetic head row tools pass beneath the x axis brush 934, surfactant and then DI water are sprayed from dispensers 935 and 936 onto the x axis brush 934.

Before exiting the washing chamber 904, the magnetic head row tools pass through post-rinse dispensers 938 and 940 which spray DI water onto the magnetic heads. Finally, pressurized air is blown by air dispenser nozzles 942 and 944 to dry the magnetic heads.

Upon entering the unload area 904, conveying belt 910 is removed from one side of the magnetic head row tools. Conveying belt 912 then carries the magnetic head row tools to an unloading means 946 such as a gravity fed chute to remove the magnetic head row tools from the washing station 900. Thus, the magnetic head row tools are continuously conveyed through the automatic wash station.

As in the first and second embodiments, a conveyor belt drive motor can be controlled to operate at various speeds. Additionally, other features can be carried over from the first and second embodiments within the scope of the present invention.

Although the invention has been described above with particularity, this was merely to teach one of ordinary skill in the art how to make and use the invention. Many modifications will fall within the scope of the invention, as that scope is defined by the following claims.

What is claimed is:

1. A magnetic head cleaning apparatus comprising:
a wash station housing;
a shuttle for holding a magnetic head;
means for dispensing a liquid onto the magnetic head while the head is held by the shuttle in a first location in the housing;
means for brushing the magnetic head while the head is in a second location in the housing;
means for drying the magnetic head while the head is in a third location in the housing; and
means for moving the shuttle from an initial position, and among the means for dispensing, the means for brushing and the means for drying, while the shuttle is holding the magnetic head, and for returning the shuttle to the initial position.

2. The magnetic head cleaning apparatus of claim 1 further comprising:
a control means which controls the means for dispensing liquid, the means for moving, the means for brushing, and the means for drying; and
a program for automatically operating the control means.

3. A magnetic head cleaning apparatus comprising:
a wash station housing;
means for shuttling a magnetic head through the wash station housing;
means for dispensing a liquid onto the magnetic head;
means for brushing the magnetic head; and
means for drying the magnetic head,
wherein the means for shuttling comprises means for holding the magnetic head while it is within a brushing region of the housing, and wherein the means for brushing comprises:
a first rotating brush having a first axis of rotation and disposed to brush against the magnetic head while the magnetic head is held by the means for holding; and
a second rotating brush disposed to brush against the magnetic head while the magnetic head is held by the means for holding, the second brush having a second axis of rotation which is neither axial with nor parallel to the first axis of rotation.

4. The magnetic head cleaning apparatus of claim 2 wherein the first axis of rotation is perpendicular to the second axis of rotation.

5. The magnetic head cleaning apparatus of claim 2, wherein the magnetic head has a plurality of surfaces, and wherein both of the first and second brushes are disposed to brush the same one of the plurality of surfaces.

6. A magnetic head cleaning apparatus comprising:
a wash station housing;
means for shuttling a magnetic head through the wash station housing;
means for dispensing a liquid onto the magnetic head;
means for brushing the magnetic head; and
means for drying the magnetic head,
wherein the means for shuttling comprises means for moving the magnetic head within a brushing region of the housing in a direction of travel, and wherein the means for brushing comprises a rotating brush disposed to brush against the magnetic head while the means for moving is moving the magnetic head in the direction of travel, the brush rotating about an axis in a rotation direction opposite the direction of travel.

7. A magnetic head cleaning apparatus comprising:
a wash station housing;
means for shuttling a magnetic head through the wash station housing;
means for dispensing a liquid onto the magnetic head;
means for brushing the magnetic head; and
means for drying the magnetic head,
wherein the means for shuttling carries the magnetic head in two different directions.

8. A magnetic head cleaning apparatus comprising:
a wash station housing;
means for shuttling a magnetic head through the wash station housing;
means for dispensing a liquid onto the magnetic head;
means for brushing the magnetic head; and
means for drying the magnetic head,
wherein the wash station housing has an x axis and a y axis substantially perpendicular to the x axis,
wherein the means for shuttling carries the magnetic head in a direction parallel to the x axis, and
wherein the means for shuttling also carries the magnetic head in a direction parallel to the y axis.

9. A magnetic head cleaning apparatus comprising:
a wash station housing;
means for shuttling a magnetic head through the wash station housing;
means for dispensing a liquid onto the magnetic head;
means for brushing the magnetic head; and
means for drying the magnetic head,
wherein the wash station housing has an x axis and a y axis substantially perpendicular to the x axis.
wherein the means for brushing comprises:
a first rotating brush having an axis of rotation parallel to the x axis; and
a second rotating brush having an axis of rotation parallel to the y axis.

10. A magnetic head cleaning apparatus comprising:
a wash station housing;
means for shuttling a magnetic head through the wash station housing;
means for dispensing a liquid onto the magnetic head;
means for brushing the magnetic head; and
means for drying the magnetic head,
wherein the wash station housing has a support base, a z axis running from the support base upward in a vertical direction, an x axis substantially perpendicular to the z axis, and a y axis substantially perpendicular to both the z axis and the x axis,
wherein the magnetic head has a magnetically active surface, a deposition side and an identification side, and
wherein the means for brushing comprises:
a first rotating brush having an axis of rotation parallel to the x axis the first rotating brush serving to brush the magnetically active surface;
a second rotating brush having an axis of rotation parallel to the z axis, the second rotating brush serving to brush the identification side; and
a third rotating brush having an axis of rotation parallel to the z axis, the third rotating brush being offset from the second rotating brush along the y axis, the third rotating brush serving to brush the deposition side.

11. A magnetic head cleaning apparatus comprising:
a wash station housing;
means for shuttling a magnetic head through the wash station housing;
means for dispensing a liquid onto the magnetic head;
means for brushing the magnetic head; and
means for drying the magnetic head,
wherein the means for shuttling comprises:
a spring loaded member serving to clamp a magnetic head row tool carrying the magnetic head; and
a plate with an opening through which the means for shuttling substantially passes, but through which the spring loaded member will not completely pass, the plate serving to compress a spring in the spring loaded member to unclamp the magnetic head row tool.

12. A magnetic head cleaning apparatus comprising:
a wash station housing;
means for shuttling a magnetic head through the wash station housing;
means for dispensing a liquid onto the magnetic head;
means for brushing the magnetic head; and
means for drying the magnetic head,
wherein the means for shuttling comprises:
a shuttle drive belt;
a first clamping means to hold one end of a shuttle drive belt; and
a second clamping means to hold a second end of the shuttle drive belt, the second clamping means including a tensioning screw for taking up slack in the shuttle drive belt.

13. A magnetic head cleaning apparatus comprising:
a wash station housing;
means for shuttling a magnetic head through the wash station housing;
means for dispensing a liquid onto the magnetic head;
means for brushing the magnetic head; and
means for drying the magnetic head,
wherein the liquid dispensing means comprises:
means for dispensing deionized water for washing the magnetic head;
means for dispensing surfactant for washing the magnetic head; and
means for dispensing deionized water for rinsing the magnetic head.

14. A magnetic head cleaning apparatus comprising:
a wash station housing;
means for shuttling a magnetic head through the wash station housing;
means for dispensing a liquid onto the magnetic head;
means for brushing the magnetic head; and
means for drying the magnetic head,
further comprising a surfactant bottle cap comprising:
an opening for tubing to carry surfactant to the means for dispensing a liquid; and
a stopper tapered to fitting a standard one gallon bottle,
wherein the surfactant bottle cap has 6 threads per inch enabling the surfactant bottle cap to be screwed onto the standard one gallon bottle.

15. A magnetic head cleaning apparatus comprising:
a wash station housing;
means for shuttling a magnetic head through the wash station housing;
means for dispensing a liquid onto the magnetic head;
means for brushing the magnetic head; and
means for drying the magnetic head, wherein the means for shuttling further comprising a means for clamping a fixture which holds the magnetic heads.

16. A magnetic head cleaning apparatus comprising:
a wash station housing having a support base, an x axis and a y axis running substantially perpendicular to the x axis;
a shuttle for carrying a vise containing a plurality of magnetic heads along the x axis of the wash station housing;
a deionized water nozzle for dispersing deionized water to pre-rinse and to post-rinse magnetic heads;
a first rotating brush having an axis of rotation parallel to the x axis;
a second rotating brush having an axis of rotation parallel to the y axis;
a surfactant nozzle for dispersing surfactant to wash the magnetic heads; and
an air nozzle for blowing air to dry the magnetic heads.

17. The magnetic head cleaning apparatus of claim 16 wherein the first and second rotating brushes rotate in a direction opposite to a direction of travel of the shuttle.

18. The magnetic head cleaning apparatus of claim 16 wherein the shuttle also carries the plurality of magnetic heads back and forth along the y axis of the wash station housing.

19. The magnetic head cleaning apparatus of claim 18 further comprising:
a control means which controls motion of the drive belt, spraying by the deionized water nozzles, spraying by the surfactant nozzle, speed of the first, second, and third brushes, and blowing by the air nozzle; and
a program for automatically operating the control means.

20. The magnetic head cleaning apparatus of claim 16, for use in an environment having an ambient temperature, wherein the air nozzle for blowing air blows air at a temperature above the ambient temperature.

21. A magnetic head cleaning apparatus comprising:
a wash station housing having a support base, a z axis running from the support base upward in a vertical direction, an x axis substantially perpendicular to the z axis, a y axis substantially perpendicular to both the z axis and the x axis, the wash station further including an opening for inserting a magnetic head row tool, the magnetic head row tool carrying magnetic heads having magnetically active surfaces, deposition sides, and identification sides;
a shuttle for carrying the magnetic head row tool along the x axis of the wash station housing;
a deionized water nozzle for spraying deionized water to pre-rinse and to post-rinse the magnetic head row tool;
a first rotating brush having an axis of rotation parallel to the x axis, the first rotating brush serving to brush the magnetically active surfaces of the magnetic heads;
a second rotating brush having an axis of rotation parallel to the z axis, the second rotating brush serving to brush the identification sides of the magnetic heads;
a third rotating brush having an axis of rotation parallel to the z axis, the third brush being offset from the second rotating brush along the y axis, the third brush serving to brush the deposition sides of the magnetic heads.
a surfactant nozzle for spraying surfactant to wash the magnetic heads; and
an air nozzle for blowing air to dry the magnetic heads.

22. The magnetic head cleaning apparatus of claim 21 further comprising:
a control means which controls motion of the shuttle, spraying by the deionized water nozzle, speed of the first, second, and third brushes, spraying by the surfactant nozzle, and blowing by the air nozzle; and
a program for automatically operating the control means.

23. The magnetic head cleaning apparatus of claim 21 wherein the second rotating brush and the third rotating brush rotate in a direction which move opposite to a direction of travel of the shuttle.

24. The magnetic head cleaning apparatus of claim 21 wherein the shuttle comprises:
a spring loaded member serving to clamp the magnetic head row tool; and
a plate with an opening through which the shuttle substantially passes, but through which the spring loaded member will not completely pass, the plate serving to compress a spring in the spring loaded member to unclamp the magnetic head row tool.

25. A magnetic head cleaning apparatus comprising:
a washing chamber including,
means for dispersing a liquid onto magnetic heads carried by a plurality of magnetic head row tools,
means for brushing the magnetic heads, and
means for drying the magnetic heads;
means for loading the plurality of magnetic head row tools into the washing chamber continuously to form a stream of magnetic head row tools;
means for conveying the stream of magnetic head row tools through the washing station; and
means for outputting the stream of magnetic head row tools from the means for conveying.

26. A continuous flow magnetic head cleaning apparatus comprising:
a wash station housing having a support base, a z axis running from the support base upward in a vertical direction, an x axis substantially perpendicular to the z axis, a y axis substantially perpendicular to both the z axis and the x axis, the wash station further including an opening for inserting a plurality of magnetic head row tools, the plurality of magnetic head row tools carrying magnetic heads having magnetically active surfaces, a deposition sides, and identification sides;
a drive belt having teeth shaped to consecutively catch and carry the plurality of magnetic head row tools;
means for consecutively carrying the plurality of the magnetic head row tools from the opening for inserting a plurality of magnetic head row tools to the drive belt;
a deionized water nozzle for spraying deionized water to wash the magnetic heads;
a surfactant nozzle for spraying surfactant water to wash the magnetic heads;
a first rotating brush having an axis of rotation parallel to the x axis, the first rotating brush serving to brush the magnetically active surfaces of the magnetic heads;

a second rotating brush having an axis of rotation parallel to the z axis, the second brush serving to brush the identification sides of the magnetic heads;

a third rotating brush having an axis of rotation parallel to the z axis, the third brush being offset from the second brush along the y axis, the third brush serving to brush the deposition sides of the magnetic heads;

an air nozzle for blowing air to dry the magnetic heads;

a deionized water nozzle for spraying deionized water to post-rinse the magnetic heads; and means for consecutively carrying the plurality of magnetic head row tools from the drive belt to the opening for outputting the plurality of magnetic head row tools.

27. A magnetic head cleaning apparatus comprising:
a wash station housing;
a shuttle for holding a magnetic head;
means for dispensing a liquid onto the magnetic head while the head is in a first location in the housing;
means for brushing the magnetic head while the head is held by the shuttle in a second location in the housing;
means for drying the magnetic head while the head is in a third location in the housing; and
means for moving the shuttle from an initial position, and among the means for dispensing, the means for brushing and the means for drying, while the shuttle is holding the magnetic head, and for retuning the shuttle to the initial position.

* * * * *